United States Patent
Curran

[15] 3,692,253
[45] Sept. 19, 1972

[54] BELT RETRACTOR AND LOCKING MECHANISM

[72] Inventor: Robert J. Curran, Elmhurst, Ill.

[73] Assignee: Borg-Warner Corporation, Chicago, Ill.

[22] Filed: June 21, 1965

[21] Appl. No.: 465,629

[52] U.S. Cl. .............................................. 242/107.4
[51] Int. Cl. .............................................. A62b 35/00
[58] Field of Search ......... 242/107.5 B, 107.2, 107.4, 242/107.5, 107.6; 297/385–388; 24/134 KA, 134 KB, 134 KC, 168, 170; 188/65.1; 280/150 SB

[56] References Cited

UNITED STATES PATENTS 3,287,062 11/1966 Board et al. ................ 297/388
2,816,339 12/1957 Prete, Jr. et al. ............ 24/170

Primary Examiner—Werner H. Schroeder
Attorney—Donald W. Banner, Lyle S. Motley and C. G. Stallings

[57] ABSTRACT

A belt retracting apparatus includes a spring-motivated reel and a jaw clamp for gripping the belt. One portion of the jaw clamp is a freely rockable locking lever about which a portion of the belt is trained such that the tension exerted by the reel rocks the lever to unlock the clamp releasing the belt for retraction, and a greater tension rocks the lever in the opposite direction to lock the clamp gripping the belt to prevent extraction. A latch is provided for disabling the automatic gripping action during an initial extraction of the belt but once belt tension is relaxed, further extraction is prevented until the latch is reset by retracting a predetermined portion of belt. The latch may be reset by a double thickness of belt or by the number of convolutions on the reel. The other portion of the jaw clamp is a resilient bowed beam which deflects under load to increase the gripping area and also to change the effective lever arm ratio of the locking lever. Thus, the belt is protected against destructive gripping forces under extremes of belt tension by changing the leverage ratio of the locking lever and increasing the area of gripping contact.

28 Claims, 32 Drawing Figures

Inventor:
Robert J. Curran
By Herman E. Smith
Atty.

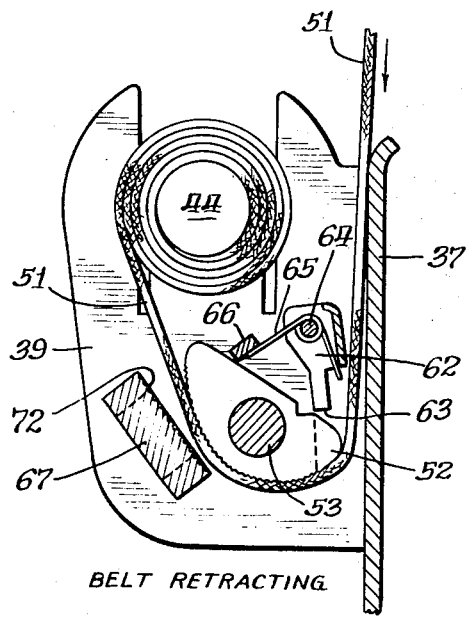
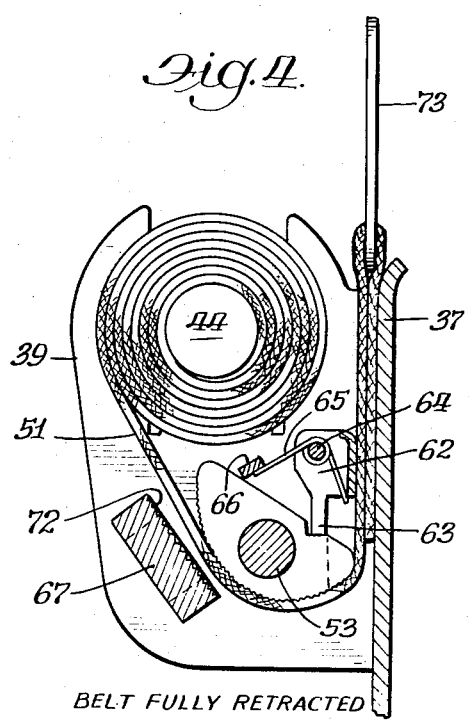
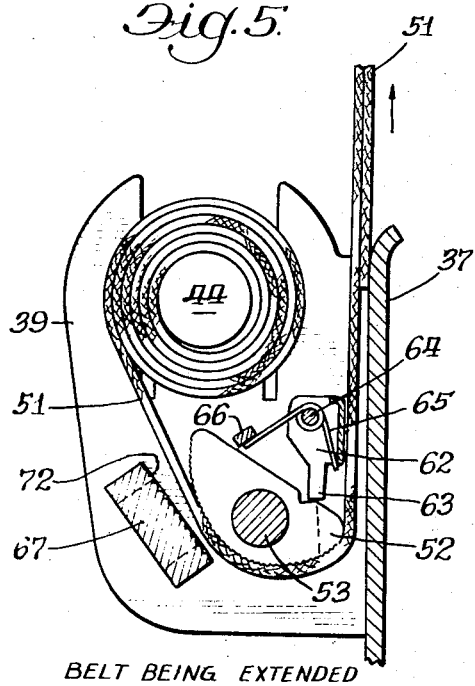
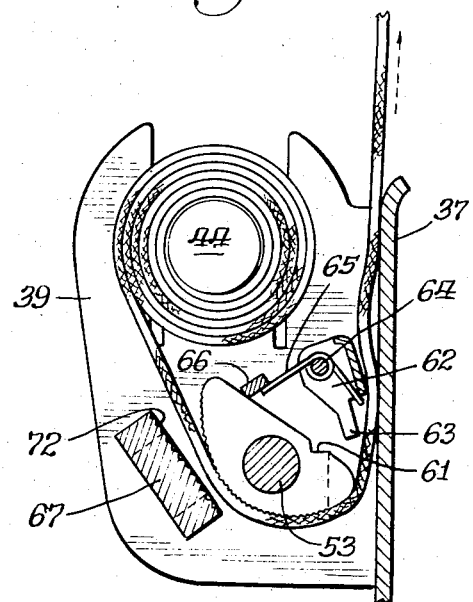

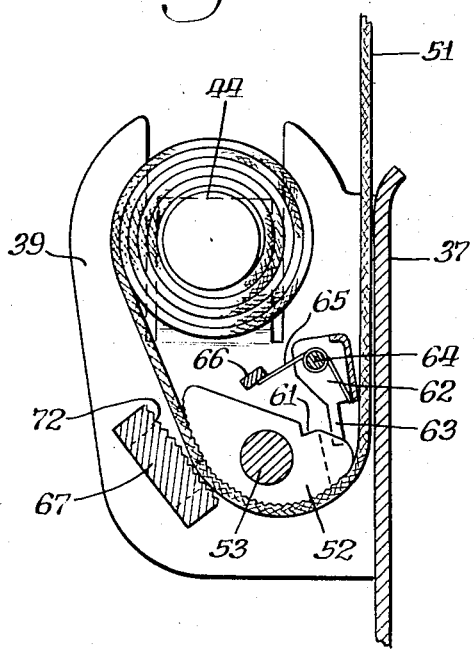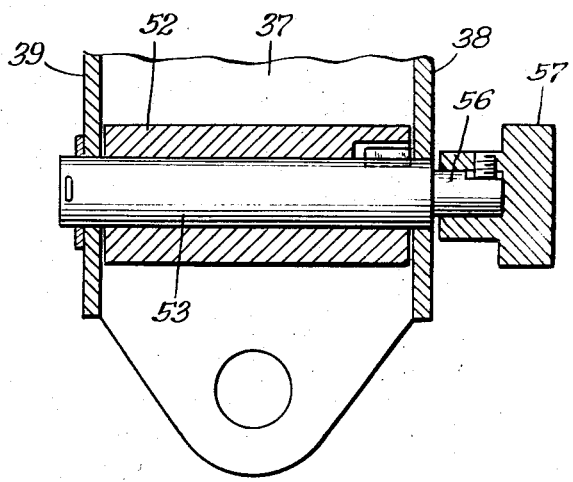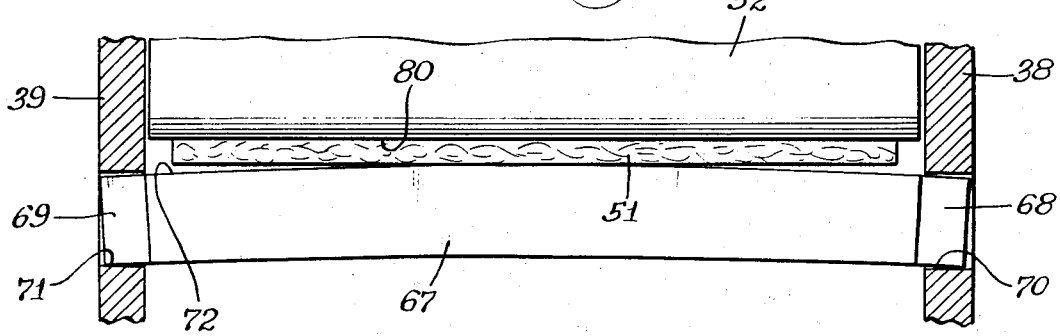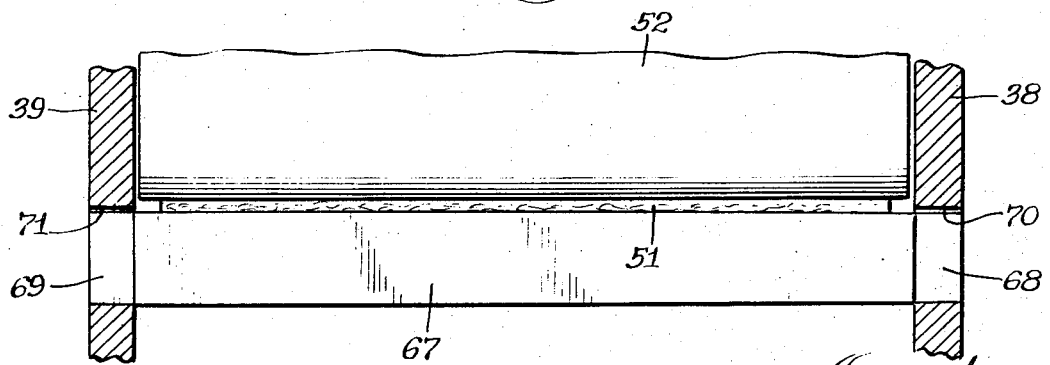

START OF LOCK

LOCKING AT HIGH LOAD

Inventor:
Robert J. Curran
By Herman E. Smith
Atty.

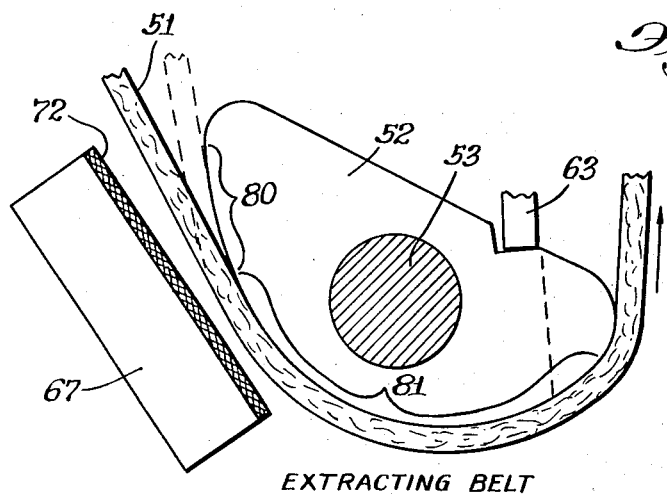
Fig. 12. EXTRACTING BELT
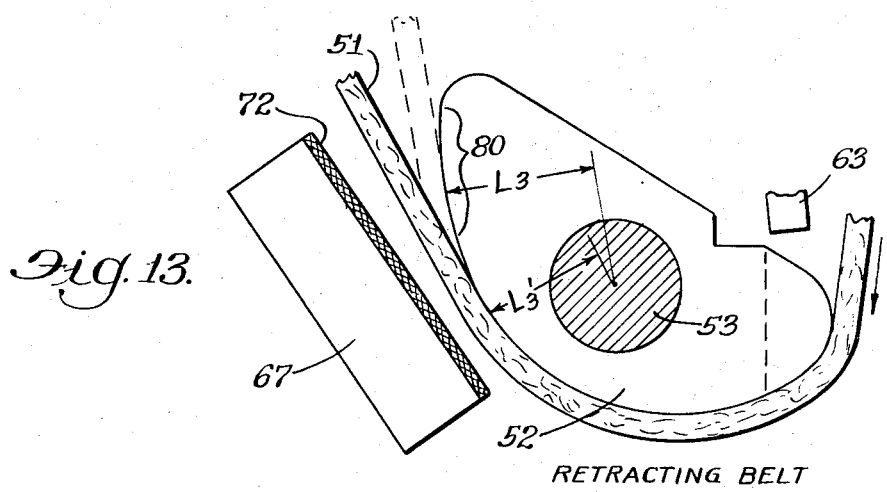
Fig. 13. RETRACTING BELT
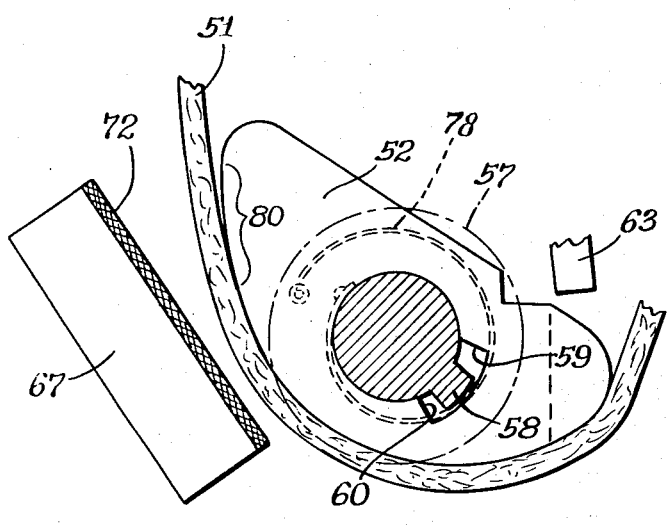
Fig. 14. LOST MOTION FOR MANUAL RELEASE
Inventor:
Robert J. Curran
By: Herman E. Smith
Atty.

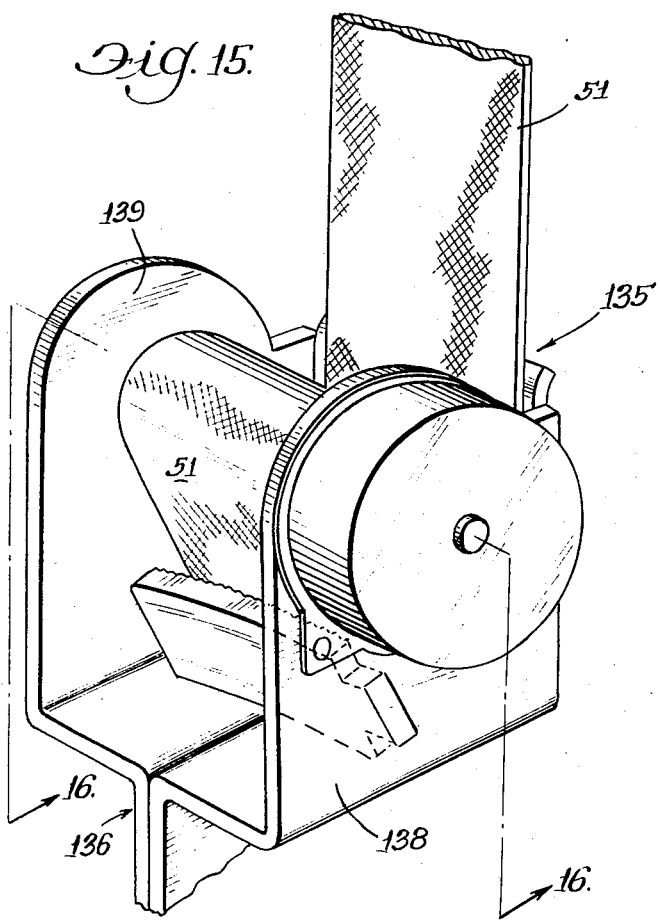
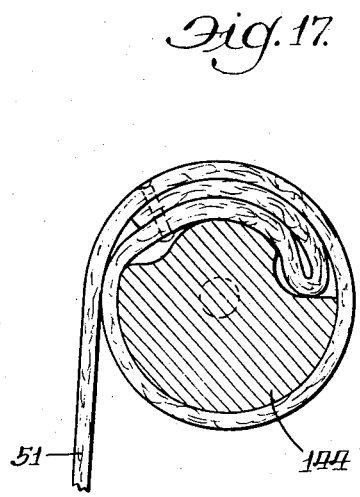
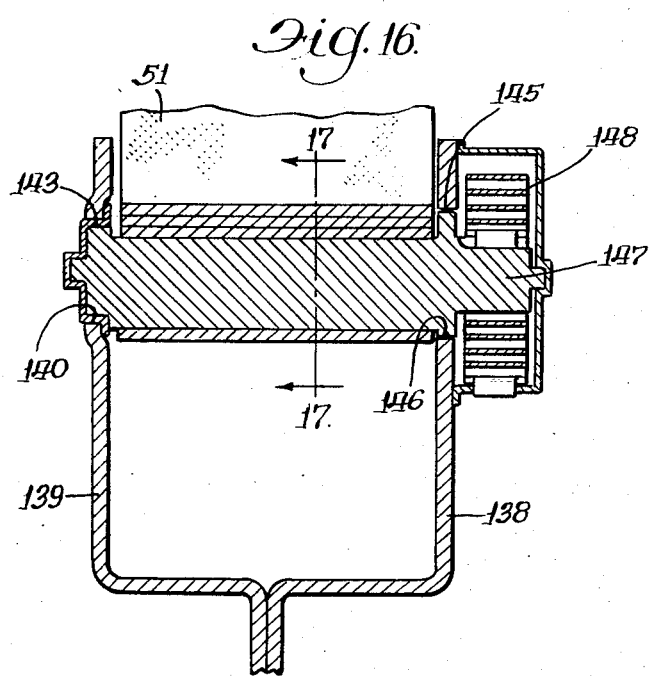
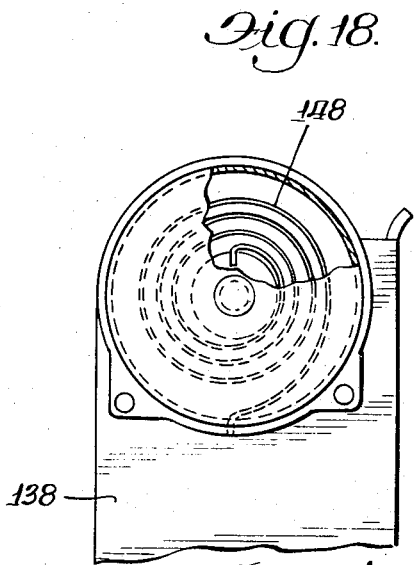

BELT RETRACTING

BELT FULLY RETRACTED

BELT BEING EXTENDED

BELT LOCKED

Inventor:
Robert J. Curran
By Herman E. Smith
Atty

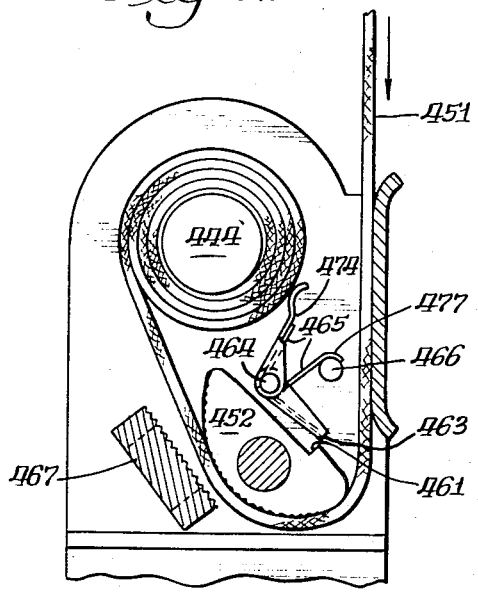
Fig. 27.
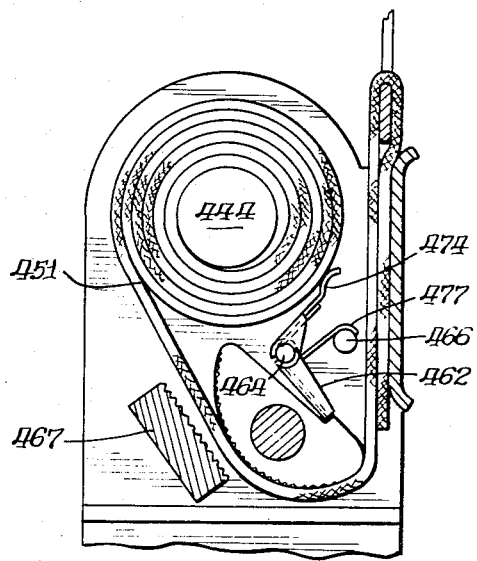
Fig. 28.
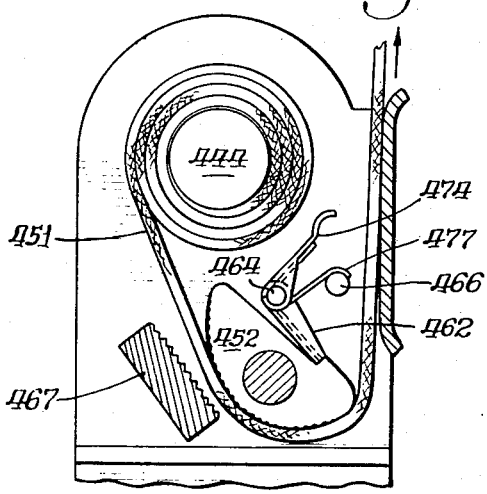
Fig. 29.
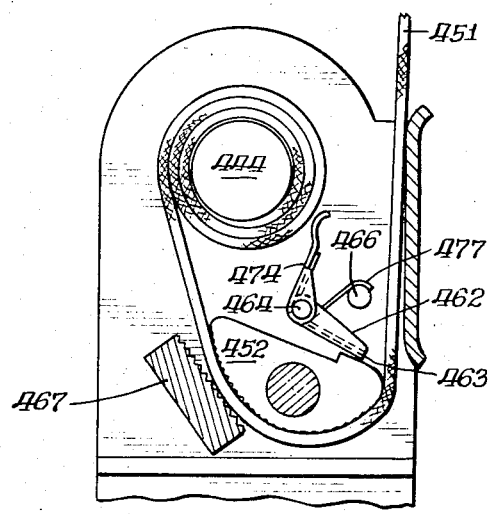
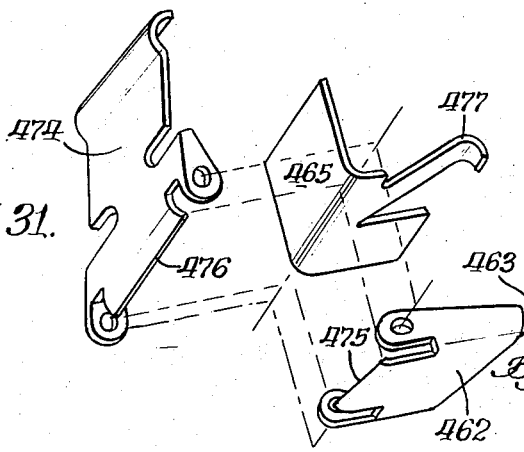
Fig. 30.
Fig. 31.
Inventor:
Robert J. Curran
By Herman E. Smith
Atty.

BELT RETRACTOR AND LOCKING MECHANISM

The present invention relates to restraining belt retractors including belt clamps and, more particularly, to self-contained retractors which are adapted to be fastened to the floor, the seat, or other structure of a passenger or cargo carrier.

Previously available spring motivated reel retractor units have presented a problem in providing therein a satisfactory lock or clamping means for the belt itself, which lock or clamping means would cooperate reliably with the action of the reel and/or the belt.

The length of a restraining belt for objects such as passengers or cargo is normally determined by the particular object and thus will require a specific length for a particular passenger or article of cargo. Once a specific length of belt has been determined it becomes important to provide reliable belt engaging and locking means to prevent any further inadvertent or unintended withdrawal, such as might occur upon sudden deceleration or acceleration. It is also desirable such retractors per se be effective to take up any undesirable slack that may occur, as when the passenger or cargo shifts or contracts; and to provide suitable manually accessible means in the particular combination for releasing the belt lock under selected circumstances.

Prior art arrangements include broadly spring motivated reels and belt lock combinations. See for example U.S. Pat. No. 2,071,903 Shively.

Briefly described the present invention provides a belt retractor for ground vehicles and aircraft which includes an improved and effective form of locking lever and reaction beam. The locking means is actuated by a spring motivated reel and a portion of the belt. This combination of elements provides an effective belt retracting, positioning, and anchoring means while simultaneously avoiding excessive scrubbing or abrading forces in the belt.

It is an object of this invention to provide an improved belt retractor, including a belt lock or clamp of the aforementioned character wherein the belt length is automatically taken up by a spring motivated reel.

It is another object to provide an improved mechanism of the aforementioned character wherein the lock is effective to grip or to release the belt in response to a differential force or pull. This differential is a result of the pull of the spring motivated reel acting on one end of the belt and an opposite manual pull acting on the other end of the belt.

It is a still further object to provide in a retractor unit of the present type an improved form of belt lock which engages the fabric of the belt and which is operable to a major extent by a rolling action between the belt and a part of the gripping or clamping lever. This belt lock is effective to hold the belt against severe shock loads and subsequent to the application of severe shock loads may be repostured in its released position by the spring reel pull on the belt in the retracting direction. In the released position the belt lock is effective to permit relatively free flow of the belt therethrough thereby minimizing the energy requirement in the reel and also minimizing scrubbing and wear of the belt.

It is a further and more detailed object to provide a retractor of the above type, an improved lock restraining or latching means. The latching means is effective to hold the lock in a released condition to permit withdrawal of the belt until a predetermined reduction in withdrawal force is achieved at which time the latching means is deactivated. Any subsequent withdrawal pull on the belt results in the locking means anchoring the belt with respect to the vehicle. The latching means, once deactivated, remains deactivated until a predetermined portion of the belt is retracted at which time the belt lock is again latched in released condition to permit the belt to be again withdrawn from the retractor.

It is a still more detailed object to provide in a device of the present character an improved form of pivoted locking lever in combination with a reaction beam to cause initial engagement of the belt therebetween in a small localized area or spot of the belt intermediate the transverse extremities of the belt and successively operable thereafter in response to further arcuate movement of the pivoted locking lever with respect to the reaction beam to cause an increase in the area of engagement.

The broad feature of providing a bowed or convex gripping jaw or beam for a belt has been proposed heretofore.

In the drawings:

FIGS. 3 through 6 show the operative relation of the retractor components in a typical sequence of operating conditions;

FIG. 7 is a fragmentary sectional view taken along line 7—7 of FIG. 1;

FIG. 8 is a fragmentary sectional view showing the arrangement of bowed reaction beam, belt and locking lever upon initial contact with the belt;

FIG. 9 is a view similar to FIG. 8 showing the beam flattened after subsequent initial engagement;

FIGS. 10 through 14 are enlarged schematic views illustrating the cooperation of the belt, locking lever and reaction beam under various conditions of operation;

FIGS. 15 through 18 show an alternative form of reel construction and spring motor for use with the retractor unit;

FIGS. 27 through 30 show a still further alternate form of latch mechanism in which the belt feeler is yieldable to prevent binding; and FIG. 31 is an exploded view of the improved latch mechanism of FIGS. 27 through 30.

Referring now in more detail to the drawings, the retractor unit of the present invention is indicated as 35 and includes a rigid housing 36 for supporting and securing the various components of the unit to the structure of a vehicle.

Figure 1:
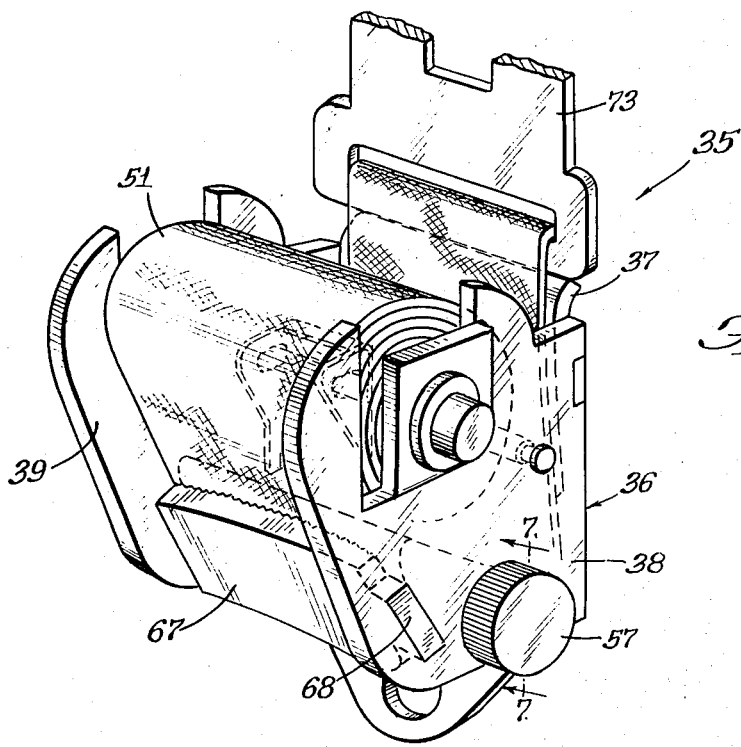
FIG. 1 is a perspective assembly view of a belt retractor unit embodying a preferred form of the present invention.
Figure 2:
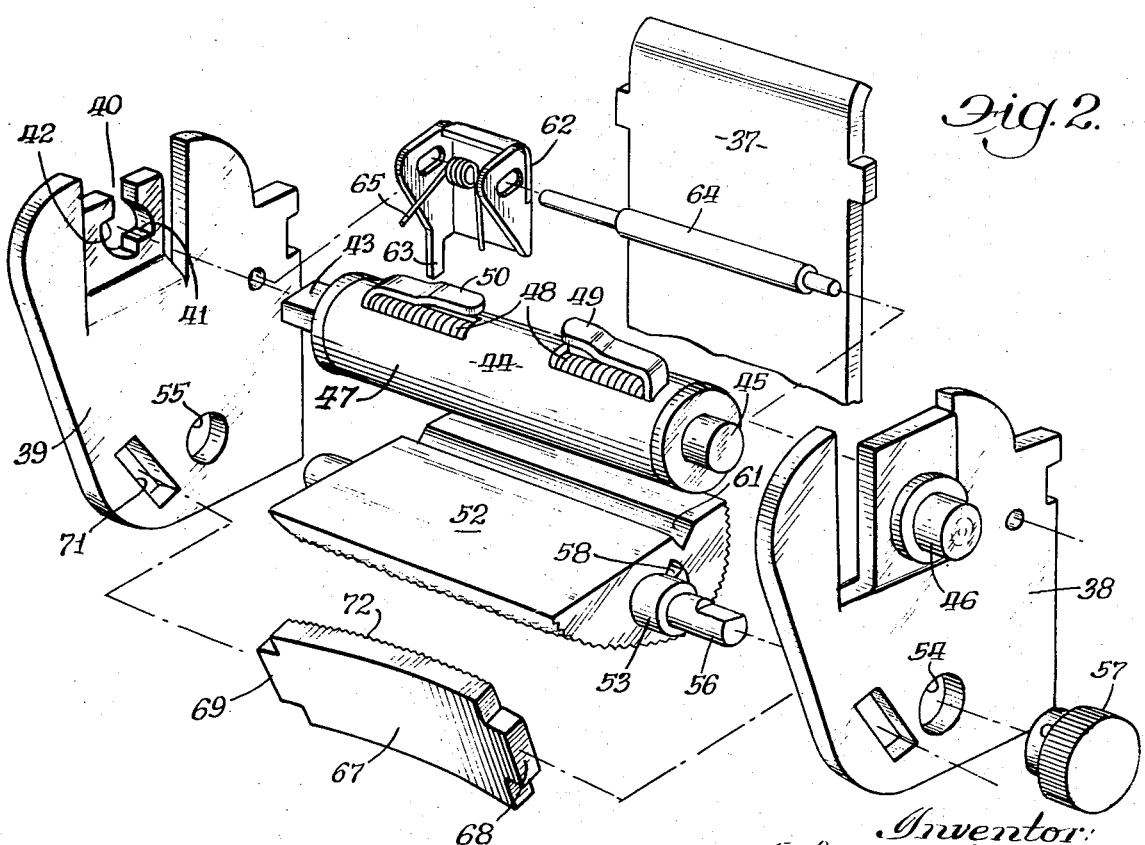
FIG. 2 is a partially exploded view of the retractor unit of FIG. 1, showing the internal structure and operative arrangement of the elements thereof.

As shown in FIGS. 1 and 2 housing 36 includes a base portion 37 and a pair of spaced side walls 38 and 39 extending from the base portion 37. Side wall 39 is provided with a slotted arcuate aperture 40 including stop surfaces 41 and 42 for engagement with a tang 43 of a spring powered reel 44. The opposite end of reel 44 is provided with a journal 45 adapted to rotate in bearing 46. Bearing 46 is mounted on the opposite side wall 38. The reel 44 thus extends transversely across the retractor unit between side walls 38 and 39 in spaced relation to the base portion 37. Reel 44 is provided with a cylindrical body portion 47 connected to journal 45 for rotation relative to tang 43. A torsion spring 48 is connected between body 47 and tang 43. Body 47 is also provided with a pair of clips 49 and 50 for securing a terminal portion of a belt 51 to the body of the reel.

Another major component of the retractor unit is the pivoted locking lever 52 mounted to twist on shaft 53 which provides a fulcrum therefor. Side walls 38 and 39 are provided with bearings 54 and 55 for supporting shaft 53 in spaced relation to both the reel 44 and the base plate 37. Shaft 53 is provided with an extension 56 which extends through side wall 38 for connection to manual control knob 57. Shaft 53 is also provided with a tooth 58 which cooperates with the stop surfaces 59 and 60 in locking lever 52, as shown in FIG. 14. Locking lever 52 is also provided with a step 61 which cooperates with latch 62 for holding the lever in unlocked position.

As shown in FIGS. 2 through 6 latch 62 is pivotally mounted on a shaft 64 extending between and secured in side walls 38 and 39. The latch spring 65 is also mounted on shaft 64 for engagement with latch 62 and a stop 66 such that the foot 63 is biased out of engagement with the step 61 on locking lever 52.

Another major component of the retractor unit is the bowed reaction beam 67. Beam 67 has a pair of tabs 68 and 69 which fit loosely in rectangular apertures 70 and 71 in side walls 38 and 39. The convex side of beam 67 is roughened by knurling to provide a gripping surface 72 which is located closely adjacent one portion of locking lever 52. As shown in FIGS. 8 and 9, beam 67 is yieldable to provide for spot engagement between the lever, belt and beam upon initial clamping action, followed by gripping engagement across the entire width of belt as the beam is flattened.

Locking lever 52 and reaction beam 67 cooperate with each other to provide a jaw type clamp which has a release position for permitting free running movement of the belt and a clamping position for clamping the belt with respect to the housing.

The other major component of the retractor unit is the belt 51 which has a connector such as buckle element 73 secured to the outer terminal thereof. The belt is arranged to follow a path through housing 36 as it is retracted and withdrawn from the unit. This path includes a first input and discharge run extending from the lever generally along the base portion 37 of the housing, a second run extending from the lever to the reel, and a base run extending around a portion of the lever connecting the first and second runs. This portion of lever 52 includes a jaw portion 80, facing beam 67, blended into a capstan like friction surface 81 to ease belt stresses.

The operating relationship between the various components of the retractor unit will be more readily understood from consideration of a sequence of operations as illustrated in FIGS. 3 through 6. FIG. 3 illustrates the operating condition in which an extended belt is being retracted onto the reel. In this condition the belt is under low tension, determined by the spring in the reel, resulting in low frictional engagement around the lever. Although the friction is low in value, it is sufficient to rock the lever away from the beam to provide for passage of the belt between the locking lever and beam. It should be particularly noted that the reel, lever and beam are disposed within the housing so that the reel always pulls the belt away from the beam to avoid frictional losses between the belt and beam during retraction. It should also be noted that as the belt is wound onto the reel, the arc of engagement between the belt and lever is decreased to compensate for the reduction of tension exerted by the reel spring motor as the belt is retracted.

FIG. 4 illustrates the condition in which the belt is fully retracted onto the reel. In this embodiment of the invention, a double thickness of belt is drawn between the base portion of the housing and the latch to move the latch to a position where its foot 63 is in engagement with the step 61 of the locking lever.

FIG. 5 illustrates the condition in which the belt is being withdrawn from the retractor unit. This requires an extraction pull in excess of the tension provided by the reel. This extraction tension is effective to exert a counterclockwise moment on locking lever 52 which is effective to increase the frictional engagement between latch foot 63 and lever step 61. When a pre-selected length of belt has been withdrawn from the unit, the subsequent reduction in belt tension permits the latch to spring out of engagement with the lever as illustrated in FIG. 5a. The reel then becomes effective to exert a retracting force on the extended portion of the belt.

The relation of the components for preventing further extraction of belt is illustrated in FIG. 6. When the latch is disengaged from the lever any further attempt to extract belt from the unit results in the rocking of lever 52 to deflect belt 51 into engagement with beam 67. The belt can thus be retracted in any desired sequence of steps, but cannot be again extended unless and until the preselected length of belt has been retracted on the reel for resetting the latch in engagement with the locking lever. The belt is thus effective to hold a passenger safely in his seat during deceleration of a vehicle. It is an important consideration that only that portion of belt which extends outwardly from the clamp is subject to stretching. It is believed apparent that this apparatus provides a highly beneficial device for protecting passengers or for preventing the unintended shifting of cargo in moving vehicles.

As described above the unit automatically prevents subsequent extractions of belt after the initial length has been withdrawn. Inasmuch as it is contemplated that this unit will be used in connection with passenger safety belts, a manual override control has been provided for releasing the locking lever when the belt is under low tension. This manual override control has been described above in connection with FIG. 2 and is shown in more detail in FIG. 7. The tooth 58 and spaced stops 59 and 60 provide a lost motion connection between the shaft 53 and manual control knob 57. A spring 78 may be connected between locking lever 52 and shaft 53 to locate tooth 58 at a mid point between stops 59 and 60, thus yieldably biasing the manual control out of contact with the lever. It should be noted that when the belt is under slight tension conditions, the knob 57 is able to provide sufficient mechanical advantage for rocking the locking lever 52. It will not, however, provide sufficient mechanical advantage to rock the lever against the moment of force produced by the belt under high tension. This effectively prevents the unintended release of the locking mechanism under emergency conditions where a passenger might otherwise be thrown against a portion of the vehicle.

A further difference between the conditions of operation under low and high tension is illustrated in FIGS. 8 and 9. As shown in FIG. 8 a low value of belt tension is effective to rock the lever against the beam to provide spot contact between the beam and belt at approximately the center of the belt. FIG. 9 illustrates the condition where a high value of belt tension has rocked the lever into full engagement with the yieldable bowed reaction beam. As shown, the beam has been flattened in response to high belt tension to provide an increased area of contact extending across the width of the belt.

FIGS. 10 through 13 illustrate the interaction of the belt, lever and beam in response to variations in belt tension as the belt is urged in extension and retraction directions.

Figure 10:
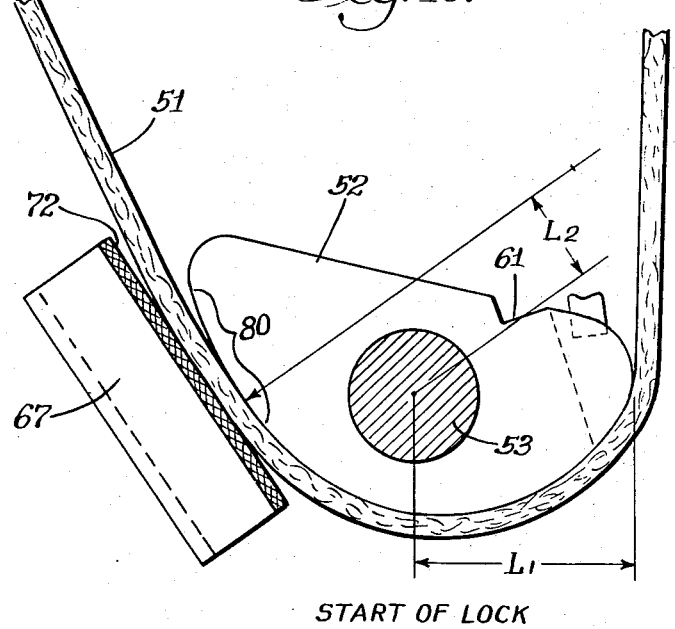
Figure 11:
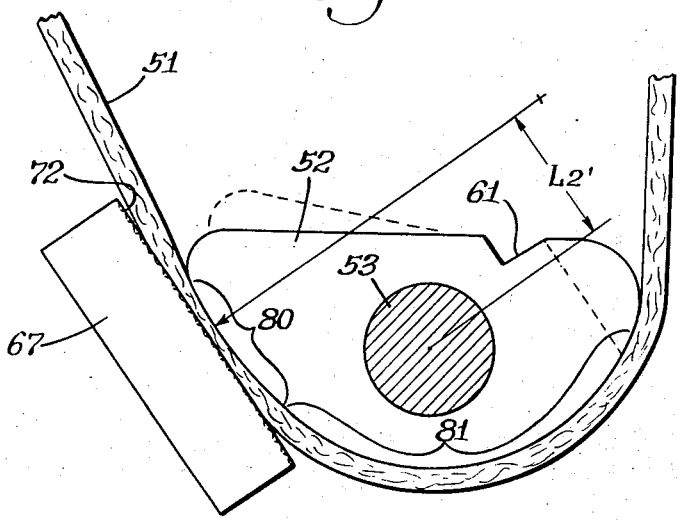
Figure 19:
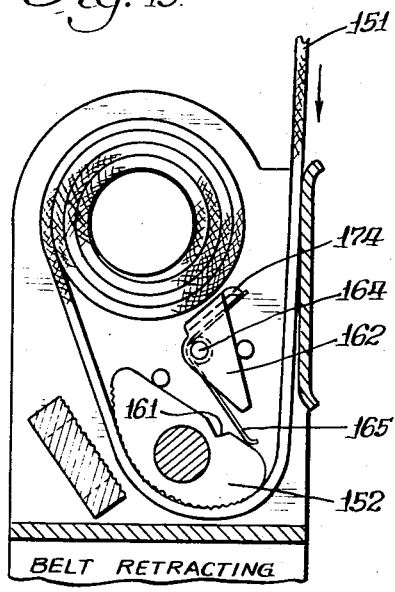
FIGS. 19 through 22 are similar to FIGS. 3 through 6 and show a modified form of latching mechanism including a feeler for sensing the length of belt accumulated on the reel.

FIG. 10 is illustrative of the condition in which initial contact has been established between the lever, belt and beam. Extraction pull on the belt is effective to exert a counterclockwise moment of force about the fulcrum of the lever which is defined by the tension in the extraction run of belt and a first lever arm, extending from the fulcrum to the belt, designated as L1. This moment of force reacts against the beam 67 at the point of spot contact and is defined by a second lever arm designated L2 in FIG. 10. The condition associated with an increase in belt tension, such as might occur during deceleration, is illustrated in FIG. 11. The increased tension, having produced an increased moment of force, results in the flattening of beam 67, with the further result that the rolling action of the lever has increased the length of the second lever arm to the position indicated by L2' in FIG. 11. This increasing length of the second lever arm provides an important benefit in that the mechanical advantage of the lever is decreased as the belt extraction pull is increased. The combined effect of increasing the gripping area while decreasing the mechanical advantage of the lever aids in protecting the belt from destructive stress concentrations under emergency conditions.

Another feature of the invention is illustrated in FIG. 13, where the effect of a clockwise moment of force provided by the reel is shown. When a relatively large length of belt has been withdrawn from the retractor unit, the reel is at a small diameter and high spring tension. The belt run extending toward the reel is then in the dotted line position of FIG. 13. The tension provided by the reel is effective to produce a clockwise moment of force acting through a third lever arm, designated L3 in FIG. 13, to rock the lever away from the beam 67. In this condition, the belt is entirely out of engagement with the beam. As belt is accumulated on the reel, the effective reel diameter increases while its spring tension decreases thereby moving the belt run to the full line position shown in FIG. 13. As the belt run moves from the dotted line to the full line position, it is evident that its arc of contact with the lever is decreased resulting in reduced frictional engagement with the lever to compensate, in part, for the reduced tension in the reel. As belt is wound up, the reel is continuously effective to provide a clockwise moment of force acting through the third lever arm which migrates between the positions designated as L3 and L3' in FIG. 13 as the angle of attack of the belt with respect to the locking beam changes.

Referring now to FIGS. 15 through 18, there is shown an alternate form of the invention in which the retractor unit 135 includes a housing 136 having spaced side walls 138 and 139. Side walls 138 and 139 are provided with bearings 140 and 146 for supporting journals 143 and 145 located on opposite ends of reel 144. An extension 147 of reel 144 is connected to the tang of a spring 148 which has its other end connected to an extension of side wall 138. Reel 144 has a portion cut away to provide for the inclusion of a double thickness of belt within its circumference, as indicated in FIG. 17. This alternate form of reel construction provides for a smooth circumference particularly useful with latch mechanisms as illustrated in FIGS. 19 through 22 and 25 through 30.

Referring now to FIGS. 19 through 22, an alternate form of latch mechanism is shown. The alternate latch mechanism 162 includes a foot 163 for engagement with the step 161 of the locking lever. A feeler 174 is spaced from the foot 163 in close proximity to the reel 144 for sensing the convolutions of belt on the reel 144. The entire latch mechanism is pivotable about the axis of pin 164, a spring 165 being effective to bias the latch out of engagement with the lever toward engagement with the reel 144. It is thus possible to select the proportions of latch 162 such that it becomes operable to restrain the lever upon the accumulation of a preselected length of belt without recourse to the use of a double thickness of belt as previously described.

Figure 20:
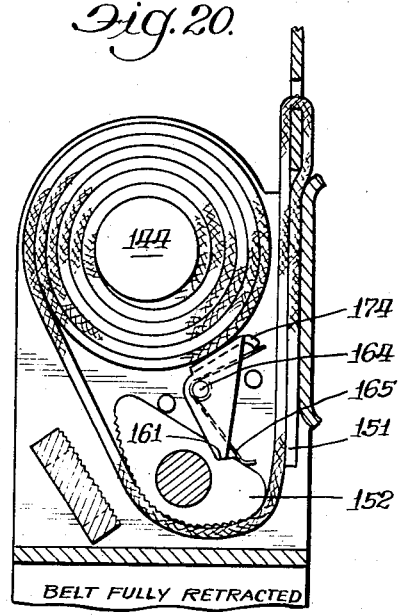

FIG. 20 illustrates the condition under which the accumulation of belt 151 on the reel 144 has rotated the latch 162 into engagement with the locking lever 152.

Figure 21:
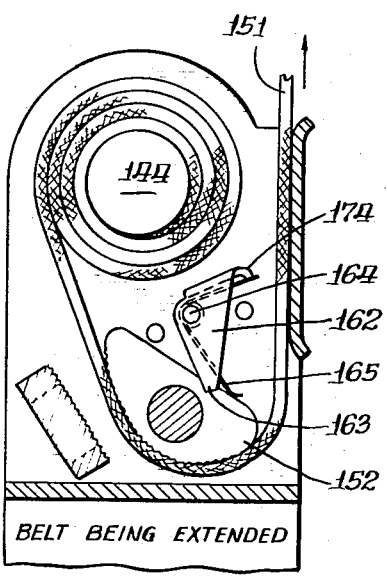
Figure 22:
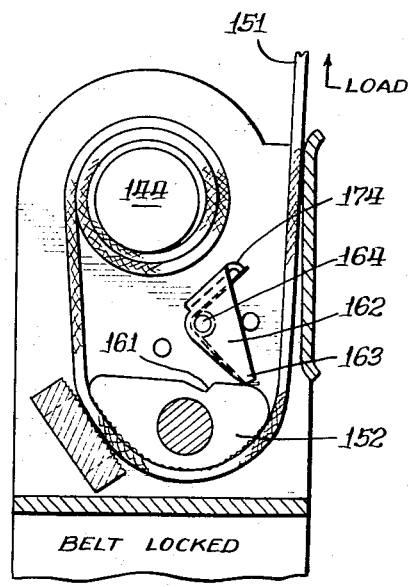

FIG. 21 illustrates the condition in which belt 151 is being withdrawn from the reel and in which the feeler 174 is also out of engagement with the belt on the reel. In this condition the tension in the belt holds the lever in engagement with the latch. As soon as the extraction pull is relaxed spring 165 will rotate the foot 163 out of engagement with the step 161 on the lever 152 so that any subsequent extraction pull is effective to clamp the belt 151 between the lever 152 and beam 167, as illustrated in FIG. 22.

Figure 23:
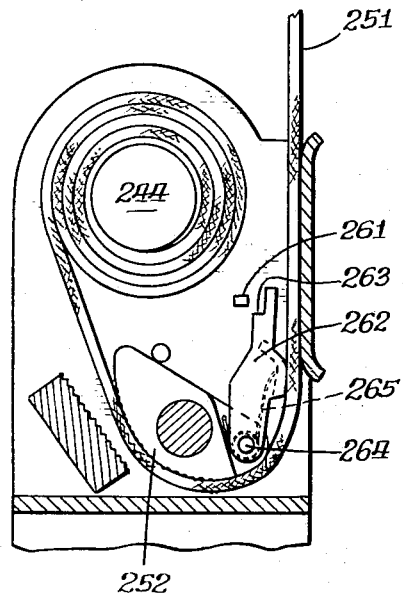
FIGS. 23 and 24 show a further modified form of latch structure in which the latch is mounted on the locking lever.
Figure 24:
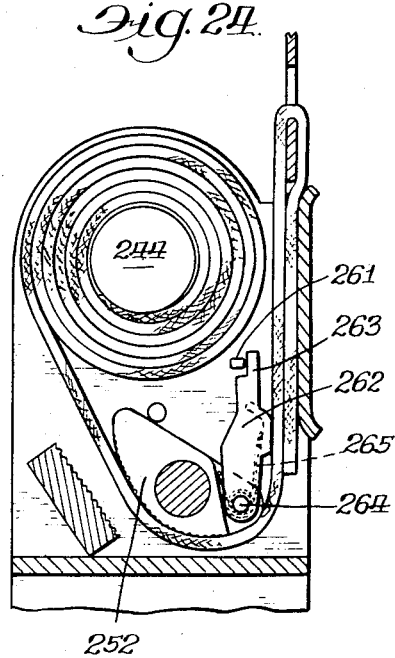

Referring now to FIGS. 23 and 24, a still further alternate form of latch is shown. The latch member 262 is pivoted on lever 252 about the pin 264. It is provided with a foot 263 which is engageable with a stop 261 mounted in the housing. A spring 265 continuously biases the latch 262 in a clockwise direction with respect to stop 261 for operation similar to the previously described forms of latch mechanism. As shown in FIG. 24 latch 262 is so proportioned that it is positively engaged with the stop 261 when a double thickness of belt 251 is present within the housing.

Figure 25:
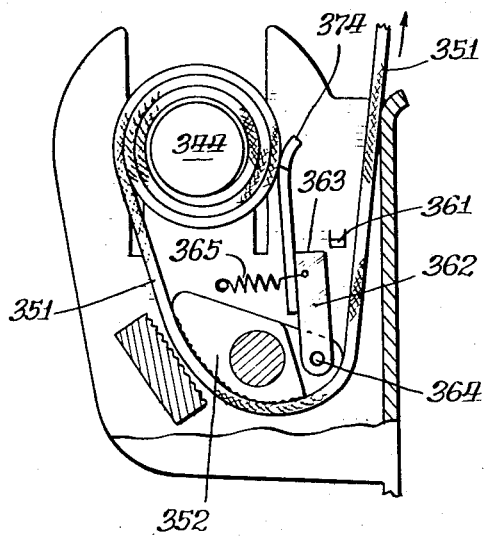
FIGS. 25 and 26 show a further modification of the structure of FIGS. 23 and 24 including a feeler for sensing the accumulation of belt on the reel.
Figure 26:
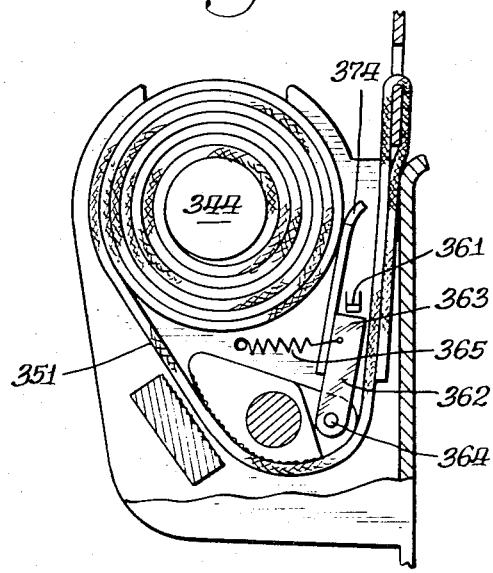

Referring now to FIGS. 25 and 26, there is shown a variation on the latch mechanism of FIGS. 23 and 24 which includes means for sensing the convolutions of belt 351 on the reel 344. The latch 362 is pivotally mounted on lever 352 about pivot pin 364. A tension spring 365 is connected between a portion of the housing and the latch 362 to bias the latch away from the stop 361 and toward the reel 344. The latch is provided with a foot 363 for engaging the stop 361 on the housing. A resilient feeler 374 extends from the main body portion of the latch 362 for engagement with the convolutions of belt 351 on the reel 344.

Referring now to FIGS. 27 through 31, there is shown a still further alternate form of latch mechanism in association with the locking lever 452 and reel 444. A pair of cross shafts, 464 and 466 extending between the side walls of the retractor housing, provide mounting and reaction member for the latch mechanism.

A latch 462 is preferably formed of sheet metal to provide a foot 463 for engaging the step 461 of the lever 452. The margins of the latch 462 are folded to provide ears which include a pair of aligned apertures, adapted to fit loosely over upper shaft 464. A portion of the latch 462 between the ears is curved to a contour concentric with shaft 464, terminating in a shoulder 475.

A feeler 474 has a curved portion along one edge thereof providing a smooth surface for engaging the convolutions of belt 451 wound upon the reel 444. The opposite edge of feeler 474 is provided with apertured ears adapted to fit loosely on upper shaft 464 in alignment with the apertures in the latch ears. As shown more clearly in FIG. 31, feeler 474 has a shoulder 476 extending between the ears.

When feeler 474 and latch 462 are assembled on shaft 464, their respective shoulders 475 and 476 abut each other to limit the angular divergence of the two members.

A leaf spring 465 is bent to form a pair of diverging end portions, one of which engages the underneath side of feeler 474. The other end portion is lanced to provide a finger 477. Finger 477 has a curved end portion adapted to hook over lower shaft 466. The remainder of the other portion extends along the underneath side of latch 462.

Normally, latch 462 and feeler 474 are held in fixed angular relation by the shoulders 475, 476 and the spring 465 to form a pair of resiliently mounted divergent legs. The finger 477 biases the latch mechanism away from the step surface 461 of lever 452 and toward the convolutions of belt 451 on the reel 444. When the reel 444 contains a large number of convolutions, as indicated in FIG. 28, the spring 465 allows the feeler 474 and latch 462 to converge toward each other without binding the latch mechanism 462 between the reel 444 and lever 452.

A typical operating sequence is illustrated by FIGS. 27 through 30. When the reel 444 is winding up belt 451 as shown in FIG. 27, the position of the lever 452 is controlled by the belt 451. The latch mechanism 462 is disengaged from the lever 452 except to the extent that it provides a stop for limiting the rocking movement of the lever 452.

When the belt 451 is wound up on the reel 444 as shown in FIG. 28, the latching mechanism 462 is rotated about shaft 464 to engage the foot 463 of latch 462 with the step 461 of lever 452. This is effective to latch the lever 452 in a position which permits free running movement of the belt 451. Excessive convolutions of the belt 451 will compress feeler 474 toward latch 462 against the bias of spring 465 without binding or jamming the latch mechanism 462 between the lever 452 and reel 444.

As belt 451 is pulled off the reel 444 (see FIG. 29), latch 462 remains in contact with lever 452 even after feeler 474 is no longer engaged with the roll of belt 451. This is the result of friction between step 461 and the latch foot surface 463; however, as soon as tension in the belt 451 is relaxed, the spring finger 477 will rotate the latch mechanism 462 out of engagement with lever 452.

As shown in FIG. 30, once the latch mechanism 462 is disengaged from the lever 452, any further attempt to extend the belt 451 will result in rocking lever 452 to clamp the belt 451 against the locking beam 467.

While I have shown and described a preferred embodiment of my invention together with alternative constructions thereof, it will be understood that various modifications can be practiced within the spirit of the invention and the scope of the following claims.

I claim:

1. A safety belt retractor unit including: a housing adapted to be fastened to a carrier; a locking beam supported on said housing having a gripping surface; means providing a locking lever having a fulcrum on said housing supporting said locking lever for free rocking movement toward and from said gripping surface defining locked and unlocked positions thereof, said lever being provided with a clamping surface complementary to an in juxtaposed relation to said gripping surface; an elongated restraining belt wrapped about said lever and in continuous engagement therewith having first and second legs thereof extending away from said lever; and means defining a retractor reel carried by said housing connected to said second leg of said belt, said reel urging said second leg of said belt away from said gripping surface of said locking beam in a direction effective to simultaneously rotate said locking lever to said unlocked position.

2. The arrangement as defined in claim 1 wherein there is further provided latching means for restraining said locking lever in said unlocked position thus providing for low friction passage of said belt about said lever, said belt being out of contact with the gripping surface of said beam in both the extension and retraction direction of movement.

3. The arrangement as defined in claim 1 wherein there is further provided means defining a latch effective to maintain the lever in said unlocked position, and means operable upon retraction of a predetermined portion of said belt effective to position said latch for subsequent engagement with said lever when said lever is moved to unlocked position.

4. The arrangement as defined in claim 1 wherein there is further provided means defining a latch effective to maintain the lever in said unlocked position, and means operable upon retraction of a predetermined portion of said belt effective to positively move said latch means into latching engagement with said lever.

5. The arrangement as defined in claim 1 wherein there is further provided means defining a latch for holding said locking lever in unlocked position, and means effective to sense the number of convolutions of belt on said reel, said sensing means being operable to move said latch means into position for engagement with said lever responsive to the accumulation of a predetermined number of convolutions on said reel.

6. The arrangement as defined in claim 5 wherein the latching means and convolution sensing means are movable as a unit about a pivotal axis, said unit being biased for engagement with said reel and including a pair of resiliently mounted divergent legs for engagement with said reel and said locking lever respectively.

7. In a retractor unit for a vehicle safety restraining belt including a housing; means defining a spring-motivated retractor reel mounted in said housing; a belt operatively disposed for movement in a path including a first input and discharge run, a second run extending to and from said reel and a base run connecting said first run with said second run; a bowed reaction locking beam disposed on one side of said belt for selective engagement with said belt in the zone of said base run, the extended plane of said beam converging toward the extended plane of said second belt run; and means defining a clamping locking lever having a fulcrum supported by said housing, said lever extending transversely in contact with the other side of said belt within the zone of said base run, said lever and said belt in combination defining a first lever arm extending from said fulcrum toward said first belt run remote from said beam and defining a second lever arm disposed in juxtaposed relation to said beam, said locking lever cooperating with said belt in said first and second belt runs to rock said locking lever about said fulcrum, an extraction pull on said belt in said first belt run acting to deflect said belt into engagement with said beam, said belt acting through said second lever arm to rock said lever away from said beam to permit said second belt run to flow onto said reel with said belt being out of contact with said beam responsive to relaxation of extraction pull to a value below the retracting force of said reel.

8. The arrangement as defined in claim 7 wherein said reaction beam extends transversely of the belt and is bowed to provide a yieldable convex surface facing said clamping lever, said belt being moved into substantially spot contact with said beam upon initial rocking action of said lever toward said beam followed by increasing area of contact as said beam is flattened by subsequent rocking action of said lever.

9. The arrangement as defined in claim 7 wherein there is additionally provided means defining a manually operable override control separate from said belt, effective to selectively rock said locking lever to disengage said belt from said beam.

10. The arrangement as defined in claim 7 wherein there is provided override control means for said lever including a manual control, a lost motion connection between said manual control and said lever, and yieldable means normally biasing said manual control out of driving contact with said locking lever.

11. The structure as defined in claim 7 wherein latching means is provided for maintaining said lever in released position, said reel providing a continuously effective biasing force in said locking lever to provide a moment about said fulcrum for rocking said lever into released position for engagement with said latching means.

12. In a safety restraining belt retractor unit; a housing; a spring torque motivated reel carried by said housing; means defining a clamping lock carried by said housing in spaced relation to said reel, said clamping lock comprising a bowed locking beam carried adjacent the terminals thereof by said housing and having a jaw surface, a fulcrum carried by said housing, a freely rockable locking lever carried by said fulcrum and having a jaw surface movable toward said beam to a clamping position and from said beam to a released position; means defining a latch for holding said lever in said released position; and, a belt having one terminal thereof connected to said reel for being wound thereon and another terminal portion thereof extending outside of said housing, said belt being threaded between said jaw surfaces and wrapped around said locking lever, said belt being effective to rock said lever into clamping position for clamping said belt between said jaw surfaces when subjected to a pull in the extracting direction in excess of the retracting effort of said reel in the opposite direction, and being further effective to rock said lever to the released position for engagement with said latch and for disengagement of said belt from said jaw surfaces when said extraction pull is relaxed to a predetermined minimum.

13. The arrangement as defined in claim 12 wherein said rockable locking lever defines a first lever arm extending from said fulcrum away from said clamping jaws, a second work lever arm extending from said fulcrum generally parallel to said jaws acting to urge said lever jaw surface in the direction of said fixed locking beam, and a third lever arm extending from said fulcrum generally towards said jaws, said wrapping relation between said belt and said pivoted clamping lever being effective through said second lever arm for moving said lever jaw surface into engagement with the belt and said locking beam for locking said belt against withdrawal force applied to the outer terminal of said belt, and said wrapping relation being further effective through said third lever arm to move said lever jaw surface into belt disengaging position for cooperation with said latch means.

14. In a vehicle safety belt retractor unit, including rigid housing adapted to be secured to a vehicle, a spring torque motivated rotatable reel carried by said housing adapted to receive a first terminal of a belt for winding a portion of said belt thereon, a seat belt having a first terminal thereof secured to said reel, and a second outer buckle element supporting terminal; the combination therewith of means defining a locking and unlocking jaw type clamp carried by said housing and engageable with a portion of said belt at a position located between said reel and second terminal of said belt, said locking clamp means having a first position in which said belt section is free to flow therethrough as the same is being retracted by said reel and having a second clamping position in which said locking clamp means is effective to prevent further withdrawal from said reel upon a pulling force being applied to said buckle element terminal, said locking clamp means comprising means defining a compressable bowed locking beam carried by said housing and extending transversely of and coextensive with the width of said belt, means defining a rockable locking lever having a work arm effective to engage the belt against said locking beam, a fulcrum for said lever mounted in said housing, said lever being supported intermediate the terminals thereof on said fulcrum, said belt section being reversely wrapped around said lever on both sides of said fulcrum about 180° and threaded between said lever and said first named locking beam in passing to and from said reel as the same is retracted and withdrawn, latch means for said lever including a portion on said lever and a portion carried by said housing, said means being responsive to the retraction of a predetermined portion of said belt section for activating said latch means into a position to restrain said lever in said first position for preventing the same from pivoting in the belt locking direction under certain conditions, said latch means being responsive to a predetermined reduction of withdrawal force applied to said belt effective to cause the release of said latch means whereupon said lever becomes effective in response to a subsequent application of withdrawal effort to said belt to cause said work arm portion of said pivoted locking lever to clampingly engage said belt against said beam and thus lock said belt against being further withdrawn, said latch defining means and said lever being made responsive to a subsequent predetermined retraction of said belt section to again cause the restraining engagement of said latch defining means, thus providing for subsequent continuous withdrawal of said belt from said reel past said lever clamp.

15. In a locking clamp adapted for a belt having a substantial width relative to the thickness thereof, means defining a reaction locking beam positioned transversely of the length of the belt, means supporting said beam adjacent the terminals thereof, said beam being formed with a bow therein to provide a convex surface arranged to receive an initial contact by the belt intermediate the transverse edges of said belt, means defining a locking lever having a fulcrum support adjacent said beam and a width corresponding with the transverse dimension of the belt, said lever including a first input lever arm and a second work arm, said lever being adapted to grippingly engage the belt with said beam through said second work arm, said beam responding to said engagement by said lever such that the convex portion thereof is flattened to thus increase the area of engagement of said belt between said beam and lever from a minimum value at the initial engagement to a maximum value upon full engagement, said work arm being increased in length as said beam is flattened thus changing the ratio between said first and said second lever arms.

16. In a locking clamp device for a belt, means defining an elongated reaction clamping beam supported adjacent the terminals thereof, means defining a lever, said lever having a fulcrum support intermediate its ends and adapted to be rocked into clamping engagement with a belt against said beam, means for restraining said lever in belt releasing position thereof for the free passage of a belt between said lever and beam in the extraction direction of said belt, resilient means for urging said lever restraining means in the releasing direction thereof, said lever having a curved surface on the beam side thereof adapted to have the belt wrapped thereabout for operating said lever in both the gripping and the releasing direction, said restraining means being arranged so that the same is caused to respond to a predetermined relaxation of extraction pull on the belt for causing said restraining means to release said lever for movement of said lever into clamping engagement of said belt against said beam upon a subsequent extraction pull on said belt.

17. In a retractable belt or the like, a spring-motivated retraction device, a strap connected to said device for retraction and extension, a strap clamp having a fixed part and a moving part supported for clamp closing and opening pivotal movement relative to said fixed part, said moving part being freely pivotal and having a leading edge, a trailing edge, and a pivotal axis therebetween, and means training said strap from said retraction device and reversely around said moving clamp part, in frictional engagement therewith, for exerting forces upon said moving clamp part, whereby said clamp may be opened by the spring force of said retraction device exerted through said strap upon the trailing edge of said moving clamp part and may be closed by a force exerted through said strap upon the leading edge of said moving clamp part.

18. A retractable seat belt or the like comprising retraction means, a strap connected to said retraction means for retraction and extension, clamp means for preventing extension of said strap, means responsive to tension in said strap during extension of said strap for holding said clamp means open until said strap has been extended to a desired length and for thereafter permitting said clamp means to close in response to a change in tension in said strap.

19. A retractable belt or the like comprising a retraction device, a strap connected to said device for retraction and extension, means for preventing extension of said strap, mans for rendering said extension-preventing means inoperative only after a predetermined amount of strap has been retracted by said device, and strap guide means, about which said strap is trained, receiving a force from said strap during extension of said strap to a desired length and responsive to reduction of said force thereafter for rendering the extension-preventing means operative.

20. A retractable seat belt or the like comprising a retraction device, a strap connected to said device for retraction and extension, means for preventing extension of said strap, means for rendering said extension-preventing means inoperative only after a predetermined amount of strap has been retracted, and strap guide means about which said strap is trained and responsive to retractile movement of said strap at said guide means for rendering the extension-preventing means operative when said strap has been extended to a user-restraining position following retraction of said predetermined amount.

21. In a retractable belt or the like as defined in claim 17, movable latch means selectively engageable with said moving clamp part for preventing closing of said clamp.

22. In a retractable belt or the like as defined in claim 21, said movable latch means being movable to a first position for preventing closing of said clamp in response to retraction of a predetermined portion of said strap.

23. In a retractable belt or the like as defined in claim 22, said movable latch means being retained in said first position by said force exerted through said strap upon the leading edge of said moving clamp part, and being movable therefrom in response to a reduction in said force whereby thereafter said clamp may be closed by said force.

24. In a retractable belt or the like as defined in claim 17, said fixed clamp part comprising a resiliently yieldable bowed beam disposed adjacent a surface of said moving clamp part for engagement with said strap when said clamp is closed, said bowed beam becoming flattened for increasing the area of contact with said strap in response to an increasing force exerted through said strap upon the leading edge of said moving clamp part.

25. In a retractable belt or the like as defined in claim 17, said means training said strap including a cam-like curved surface on said moving clamp part in frictional engagement with said strap for exerting turning forces upon said moving clamp part.

26. A retractable seat belt or the like as defined in claim 18 wherein said means for holding said clamp means open includes a movable latch member, said latch member being restrained in frictional engagement with a surface for holding said clamp means open in response to tension in said strap, said latch member being biased for movement away from said surface for thereafter permitting said clamp means to close in response to a reduction in tension in said strap.

27. A retractable belt or the like as defined in claim 19 wherein said means for preventing extension of said strap comprises a gripping device including a reaction member and a movable member having a first surface defining said strap guide means operative for gripping said strap to prevent extension thereof in response to an extension force in said strap received by said guide means, said means for rendering said extension preventing means inoperative including a movable latch member having a portion thereof engageable with said strap effective to move said latch member into a position for latching said movable gripping member in an inoperative condition in response to retraction of a predetermined amount of strap.

28. A retractable belt or the like as defined in claim 27 wherein said movable gripping member includes a second surface engageable with said latch member, said second surface being held in engagement with said latch member for rendering said gripping device inoperative during extension of said strap to a desired length by said extension force received by said first surface, and said latch member being biased for movement away from said second surface in response to a reduction of said extension force for thereafter rendering said gripping device operative.

* * * * *